Oct. 24, 1950
K. K. CLARK
2,527,242
EDUCATIONAL BOOK STRUCTURE
Filed Jan. 19, 1949
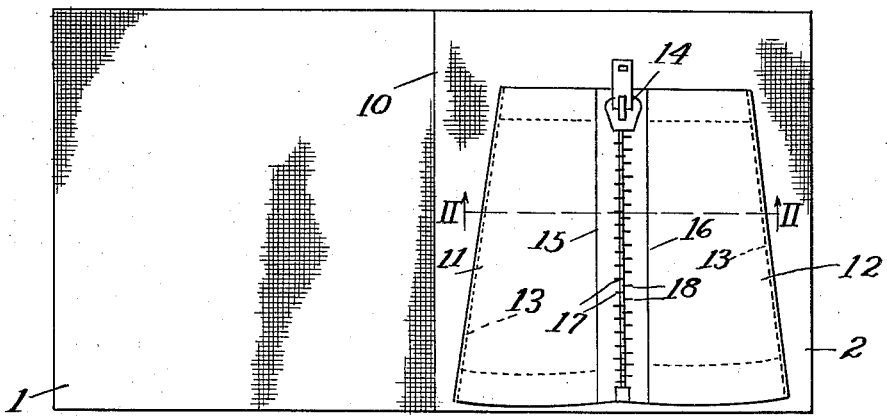
Fig. 1.
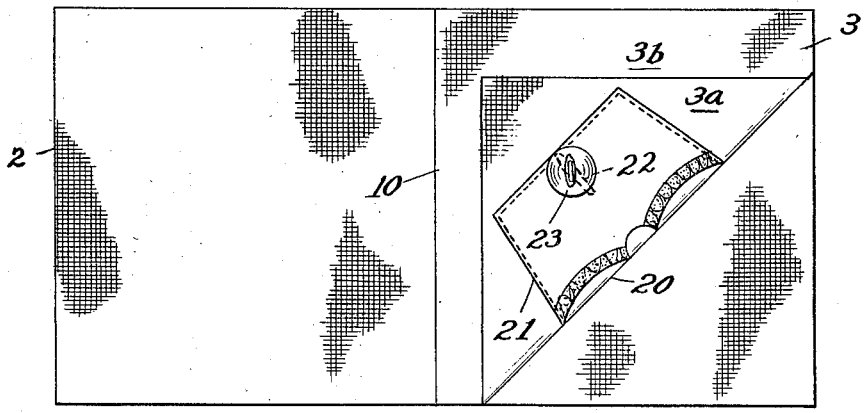
Fig. 4.
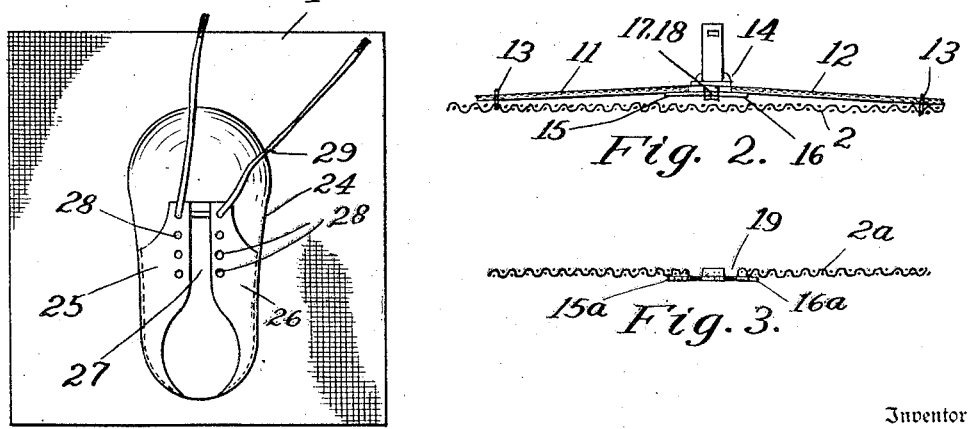
Fig. 5.
Fig. 2.
Fig. 3.
Inventor
Kathryn K. Clark
By Christy, Parmelee and Strickland
Attorneys Patented Oct. 24, 1950

2,527,242

UNITED STATES PATENT OFFICE 2,527,242

EDUCATIONAL BOOK STRUCTURE

Kathryn K. Clark, Avon, N. Y.

Application January 19, 1949, Serial No. 71,633

3 Claims. (Cl. 35—56)

My invention relates to a book entitled "All By Self," which is designed to serve as an educational device for young children. The invention consists in certain new and useful improvements in book construction, wherein certain pages of the book are formed of a plurality of page portions severally formed as elements of wearing apparel in miniature, and equipped with fastening means that are manipulative for uniting and disuniting said elements of wearing apparel, in simulation of the operations required for a child to dress and undress itself.

The invention will be understood upon reference to the accompanying drawings, illustrating a book that comprises an exemplary embodiment of the invention, wherein:

Figure 1 is a view of the book in open position, showing two of the pages in plan;

Figure 2 is a fragmentary view of one of the pages of the book in cross section, as seen on the plane II—II of Figure 1 and to larger scale;

Figure 3 is a view comparable with Figure 2, illustrating a modification in structural detail;

Figure 4 is a view comparable with Figure 1, showing the book opened at another page and illustrating a modification; and Figure 5 is a view in plan of a single page of the book, illustrating still another modification.

Referring to the drawings, the book will be understood to consist of a plurality of pages 1, 2, 3, 4, etc., formed of fabric, or other suitable material which is flexible yet tough and durable against tearing and the rough usage to which a child may subject the book. The several pages of the book may be united by stitching, or other conventional means within the ken of the book binder, so that the book may be laid open as shown in Figures 1 and 2, and the pages turned one by one on the medial line 10 of the book. In this case the fabric and structure of the book is such as to permit the book to be laundered and thus kept in cleanly condition.

In Figures 1 and 2, page 2 of the book is shown to be formed of a basal page section to which two portions 11 and 12 are firmly attached, as by means of two outer lines of stitching 13. The two portions 11 and 12 are formed of fabric in simulation of a skirt, equipped with a hookless or slide fastener 14 of conventional structure, whose two tape elements 15 and 16 are severally secured to the adjacent edges of the skirt portions 11 and 12 and equipped with lines of complementary fastener elements or "buckets" 17 and 18 adapted to be engaged and disengaged by the movement of the slide 14 therealong. Upon moving the slide 14 downward from the position in which it is shown in Figure 1, the two lines of fastener elements are disengaged and the two skirt portions 11 and 12 are separated after the manner that a normal skirt or other piece of wearing apparel is separated preparatory to applying it to or removing it from the person. Alternately, by moving the slide 14 upward the two lines of fastener elements are engaged and the two skirt portions 11 and 12 united, as the normal parts of a piece of apparel are united for wear. A child, by manipulating and "playing" with the slide fastener, will by practice learn to engage and disengage the two portions 11 and 12, which are in this case presented in the form of a miniature skirt, and, thus by practice and by mental association of the page with an actual article of wearing apparel (a skirt in this case), will quickly learn the fundamental motions required to apply or remove the actual article of wearing apparel, as it must do in learning to dress or undress itself.

On page 1, opposite to the page bearing the miniature article of wearing apparel, appropriate pertinent legends may be printed or otherwise applied, further to enhance the primary education of the child using the book.

In Figure 3, I illustrate that the body of the page (2a) may itself be medially parted, as at 19, and the two tapes 15a and 16a of the slide fastener elements may be stitched severally to the adjacent edges of the page sections. The representation of the two portions 11 and 12 of the article of wearing apparel, which in Figures 1 and 2 are shown as independent page portions (11 and 12) stitched to the page body 2, may be applied by stenciling, printing or other form of application, to the face of the page, whereby the desired instructive or educational results may be obtained.

There is a wide variety of representations of wearing apparel that may be incorporated in the multipart pages of the book of this invention, and many structural modifications are permissible without departing from the essence of the invention defined in the appended claims. It is unnecessary to an understanding of the invention that all of the modifications contemplated be illustrated and described, and it will suffice for those skilled in the art to consider the structures shown in Figures 4 and 5.

In Figure 4, I illustrate that the page 3 may be creased and folded along the line 20, bringing a page portion 3a into overlapped position upon page portion 3b. Upon the up-faced area of the page portion 3a the representation in miniature of a pair of panties or drawers 21 is applied. A button hole 22 is formed in the page portion 3a, while a button 23 is sewed or otherwise secured to the page portion 3b immediately beneath said button hole. By proper manipulations a child may learn to button and unbutton the two page portions 3a and 3b, and soon learn how to use its accomplishment in applying or removing buttoned articles of wearing apparel while dressing and undressing itself. While the article of apparel 21 is in this instance formed of cloth stitched upon the cloth page portion 3a, it will be understood that the article 21 may consist in an applique of printing or the like.

In Figure 5, page 4 of the book is shown as bearing the representation of a boot or shoe 24, with the top or upper portions 25 and 26 thereof separated, as at 27, and provided with eyes or eyelets 28 adapted to be united in usual way by means of a shoe lace 29. The top or upper portions 25 and 26 may be independent elements united to the face of the page by stitching, with the remainder of the shoe body depicted by a printed application to the page. Alternately, the entire body of the shoe may be applied to the page by printing, or the like, and the substance of the page deleted where required to provide the separation 27. The perforations 28 are, in such case, formed in the body of the page in proper relation with respect to the shoe represented. The use of the structure in teaching a child to lace and unlace its shoes is manifest.

I claim:

1. A device for teaching a child the successive manipulations required for dressing and undressing itself, comprising a book having a plurality of pages which each include as permanent elements two relatively movable page portions formed as complementary parts of an item of wearing apparel in miniature, fastening means on one of said page portions, and complementary fastening means on the other of said page portions adapted by manipulation to unite and disunite such portions.

2. A device for teaching a child the successive manipulations required for dressing and undressing itself, comprising a book having a plurality of pages which each include as permanent elements two relatively movable page portions formed as complementary parts of an item of wearing apparel in miniature, and fastening means manipulative for uniting and disuniting said page portions in simulation of the operation incident to a child dressing and undressing itself.

3. A page for a book adapted to teach a child the successive manipulations required for dressing and undressing itself, said page comprising a supporting sheet having secured thereto and constituting a permanent element thereof a relatively movable part which with other elements appearing on the page forms an illustration of an article of apparel, the movable part being manipulatable to render the illustration simulative of the article in either its applied or unapplied condition whereby a child may use the same to perform at least some of the movements associated with the wearing or removal of the simulated apparel.

KATHRYN K. CLARK.

REFERENCES CITED

The following references are of record in the file of this patent:

UNITED STATES PATENTS

| Number | Name | Date |
|---|---|---|
| 1,519,934 | Ross | Dec. 16, 1924 |
| 1,853,790 | Westcott | Apr. 12, 1932 |
| 2,275,956 | Grace | Mar. 10, 1942 |
| 2,501,902 | Howell | Mar. 28, 1950 |

OTHER REFERENCES

"The Montessori Method" by Maria Montessori translated from Italian by Anne E. George, 6th ed., Frederick A. Stokes Co., N. Y. 1912, pages 144 and 145